(12) United States Patent
Bao et al.

(10) Patent No.: US 9,684,779 B2
(45) Date of Patent: Jun. 20, 2017

(54) SECURE FACE AUTHENTICATION WITH LIVENESS DETECTION FOR MOBILE

(71) Applicant: International Business Machines Corporation, Armonk, NY (US)

(72) Inventors: Sheng Hua Bao, San Jose, CA (US); Min Li, Beijing (CN); Wei Hong Qian, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/554,296

(22) Filed: Nov. 26, 2014

(65) Prior Publication Data

US 2015/0154392 A1  Jun. 4, 2015

(30) Foreign Application Priority Data

Nov. 29, 2013 (CN) .......................... 2013 1 0628508

(51) Int. Cl.
*G06F 21/32* (2013.01)
*G06F 21/36* (2013.01)
*G06Q 20/00* (2012.01)

(52) U.S. Cl.
CPC .............. *G06F 21/32* (2013.01); *G06F 21/36* (2013.01); *G06Q 20/00* (2013.01)

(58) Field of Classification Search
CPC ...... G06F 21/32; G06F 21/31; G06F 3/04883; G07C 9/00158; G07C 2209/14; H04L 63/0861; H04L 9/3231; G06K 9/00006; G06K 9/00221; G06K 9/00255

USPC ........ 382/118, 124; 726/19, 2, 4, 5; 713/186
See application file for complete search history.

(56) References Cited

U.S. PATENT DOCUMENTS

| | | | |
|---|---|---|---|
| 8,261,090 B1 | 9/2012 | Matsuoka | |
| 8,355,530 B2 | 1/2013 | Park et al. | |
| 8,437,513 B1 | 5/2013 | Derakhshani et al. | |
| 8,457,367 B1* | 6/2013 | Sipe | G06K 9/00221 382/118 |
| 2005/0111709 A1* | 5/2005 | Topping | F41A 17/066 382/124 |

(Continued)

FOREIGN PATENT DOCUMENTS

| | | |
|---|---|---|
| CN | 101075868 A | 11/2007 |
| CN | 101447110 A | 6/2009 |

(Continued)

OTHER PUBLICATIONS

Machine Translation of JP2011215942.*

(Continued)

*Primary Examiner* — Brian Shaw
(74) *Attorney, Agent, or Firm* — Robert J. Shatto

(57) ABSTRACT

An authentication method can include, a random expression prompt, recording of the user's expression actions, and an authentication result. This is completed using a terminal device configured to display authentication information, record the user's inputted information, and send an authentication result. The terminal device may be further configured to package an authentication result, and send it to an authentication server. Subsequent actions of the user are allowed or denied based on the authentication result.

12 Claims, 5 Drawing Sheets

(56) References Cited

U.S. PATENT DOCUMENTS

| | | | | |
|---|---|---|---|---|
| 2009/0091420 A1* | 4/2009 | Dobashi | ............ | G06K 9/00288 340/5.2 |
| 2009/0309702 A1* | 12/2009 | Hirai | ....................... | G06F 21/32 340/5.83 |
| 2011/0126280 A1 | 5/2011 | Asano | | |
| 2012/0110341 A1* | 5/2012 | Beigi | ................. | G06Q 20/3223 713/186 |
| 2012/0235790 A1 | 9/2012 | Zhao et al. | | |
| 2013/0015946 A1 | 1/2013 | Lau et al. | | |
| 2013/0016882 A1 | 1/2013 | Cavallini | | |
| 2013/0188840 A1* | 7/2013 | Ma | ..................... | G06K 9/00221 382/107 |
| 2014/0075548 A1* | 3/2014 | Sampathkumaran | . | H04L 9/3231 726/19 |
| 2014/0282958 A1* | 9/2014 | Salonen | ............. | H04L 63/0861 726/7 |
| 2015/0033310 A1* | 1/2015 | Chen | .................... | H04L 9/3231 726/7 |

FOREIGN PATENT DOCUMENTS

| | | |
|---|---|---|
| CN | 102968865 A | 3/2013 |
| EP | 2560123 A1 | 2/2013 |

OTHER PUBLICATIONS

International Search Report dated Jan. 12, 2015 for International Application PCT/CN2014/088534.

Findling et al., "Towards Face Unlock: On the Difficulty of Reliably Detecting Faces on Mobile Phones", MoMM'12: Proceedings of the 10th International Conference on Advances in Mobile Computing & Multimedia, Dec. 2012, Bali, Indonesia, Copyright 2012 ACM.

Markus, N., "Overview of algorithms for face detection and tracking", http://www.fer.unizg.hr/_download/repository/KDI._Nenad_Markus.pdf.

Morris, P., "Android Jelly Bean's Facial Liveness Check Can Be Bypassed Using Simple Image Manipulation [VIDEO]", redmondpie.com, Aug. 5, 2012. http://www.redmondpie.com/android-jelly-bean-facial-liveness-check-can-be-bypassed-using-simple-image-manipulation-video/.

Pan et al., "Liveness Detection for Face Recognition", Recent Advances in Face Recognition (eds: Delac et al.), ISBN: 978-953-7619-34-3, published online Jun. 2008, pp. 109-125, InTech.

Reisinger, D., "Google wins patent on face-to-unlock feature", clnet, Sep. 5, 2012. http://www.cnet.com/news/google-wins-patent-on-face-to-unlock-feature/.

Spradlin, L., "Jelly Bean's Face Unlock Asks You To Blink For The Camera, Locks Out After Several Failed Attempts", androidpolice.com http://www.androidpolice.com/2012/06/29/jelly-beans-face-unlock-asks-you-to-blink-for-the-camera-locks-out-after-several-failed-attempts/.

CN Application 201310628508.1, entitled "Authentication Method, Authentication Apparatus, Terminal Device, Authentication Server and System", filed Nov. 29, 2013.

PCT Application CN2014/088534, entitled "Authentication Method, Authentication Apparatus, Terminal Device, Authentication Server and System", filed Oct. 14, 2014.

* cited by examiner

SECURE FACE AUTHENTICATION WITH LIVENESS DETECTION FOR MOBILE

CROSS REFERENCE TO RELATED APPLICATIONS

This application claims priority to Chinese Patent Application No. 201310628508.1, filed Nov. 29, 2013, which is incorporated herein in its entirety.

BACKGROUND

The present disclosure relates to the field of authentication technology, including an authentication method for a terminal device using random expression prompts, an authentication server, and an authentication system.

Smart mobile devices are becoming more and more popular in ordinary human life. As a big trend in banking/commerce services, mobile commerce/banking has emerged. However, security is a difficulty faced by mobile commerce/banking applications. For example, traditional security authentication methods, like USB-key or One-Time Password (OTP), cannot work well on smart phones. Biometric features, such as facial features, fingerprint features, are a kind of "natural password" that is usually unique, and does not need people to memorize. Thus, solutions have been proposed to utilize biometric features on mobile devices for security authentication.

For security authentication techniques based on facial features in the prior art, generally, it is necessary to register user's facial features at first, then authentication can be realized through comparing a user's facial features that are detected in real time and the registered facial features. An improvement to such a solution is to further enhance security through detecting the liveness of user facial features. For example, user liveness is determined through facial gesture detection.

However, it has been found that liveness detection methods in the prior art will fail if a fraud deceives a mobile device, by using a piece of video of a user that has been recorded previously. Note, a reference herein to any prior art is not to be taken as an admission or a suggestion that the content thereof was well-known or was part of the common general knowledge as at the filing date or the priority date of any of the claims.

SUMMARY

According to one embodiment of the present disclosure, there is provided an authentication method, comprising: generating a random sequence comprising at least one expression prompt, wherein the expression prompt is used to prompt a user to take a corresponding expression action; recording expression actions of the user based on the random sequence; sending information for authentication, wherein the information for authentication comprises random information of the random sequence, and expression information of the recorded expression actions; and receiving an authentication result to complete the authentication, wherein the authentication result is based on the information for authentication.

According to another embodiment of the present disclosure, there is provided an authentication method, comprising: receiving information for authentication and sending an authentication result, wherein the information for authentication comprises random information, of a random sequence comprising at least one expression prompt, and expression information of the recorded expression actions; and using the information for authentication to generate an authentication result.

According to a third embodiment of the present disclosure, there is provided an authentication apparatus, comprising: a prompt unit, configured to generate a random sequence comprising at least one expression prompt, wherein the expression prompt is used to prompt a user to take a corresponding expression action; a recording unit, configured to record expression actions of the user based on the random sequence; a sending unit, configured to send information for authentication, wherein the information for authentication comprises random information of the random sequence and expression information of the recorded expression actions; and a receiving unit, configured to receive an authentication result to complete the authentication, wherein the authentication result is based on the information for authentication.

According to a fourth aspect of the present disclosure, there is provided a terminal device, comprising an authentication apparatus according to this disclosure.

According to a fifth aspect of the present disclosure, there is provided an authentication server, comprising: a server interface unit, configured to receive information for authentication and send an authentication result; and a server authentication unit, configured to generate an authentication result using the information for authentication. The information for authentication comprises random information, of a random sequence, comprising at least one expression prompt, and expression information of the recorded expression actions.

According to a sixth aspect of the present disclosure, there is provided an authentication system, comprising the terminal device and an authentication server.

This may provide improved security through randomly prompting the user to take different expression actions.

Other features and advantages of this embodiment will become more apparent from the following description with reference to accompanying drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
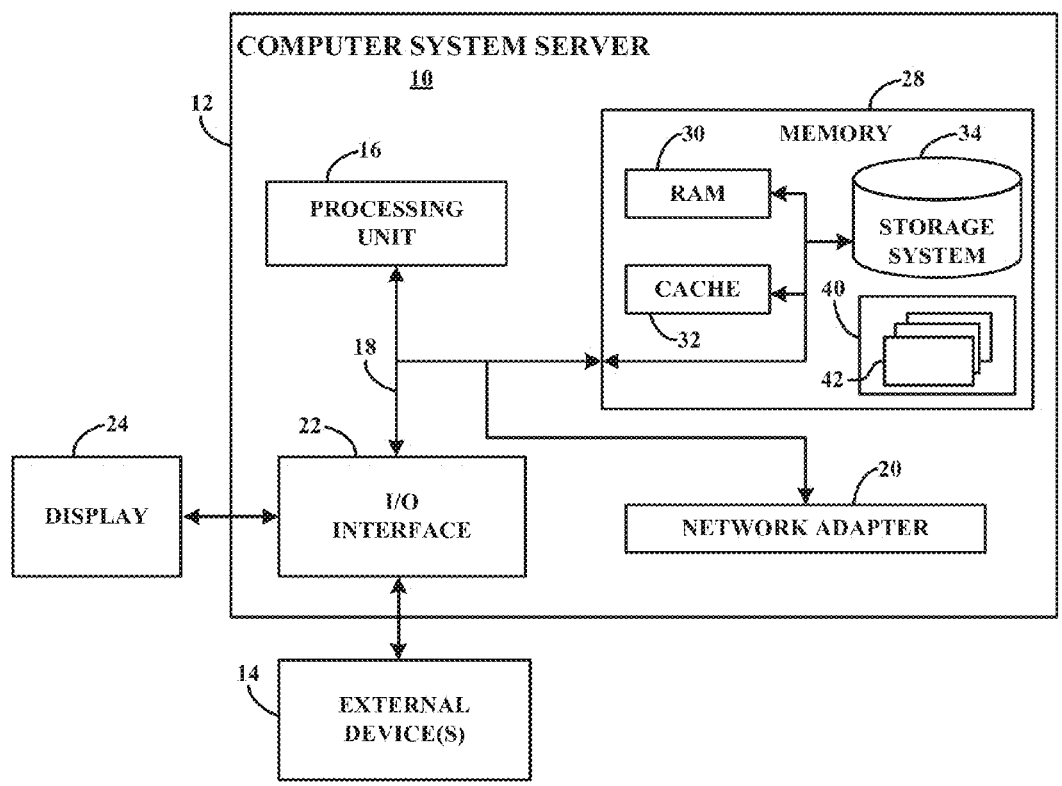
FIG. 1 shows a computer system/server which is applicable to implement the embodiments of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, a method, or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 includes a variety of computer system readable media. Such media may be any available media that is accessible by computer system/server 12, and it includes both volatile, and non-volatile media; removable, and non-removable media.

System memory 28 can include computer system readable media in the form of volatile memory, such as random access memory (RAM) 30, and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of various embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of various embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Below, examples of this embodiment will be described with reference to the drawings. Repeated portions may be omitted in the describing the embodiments and examples.

Figure 2:
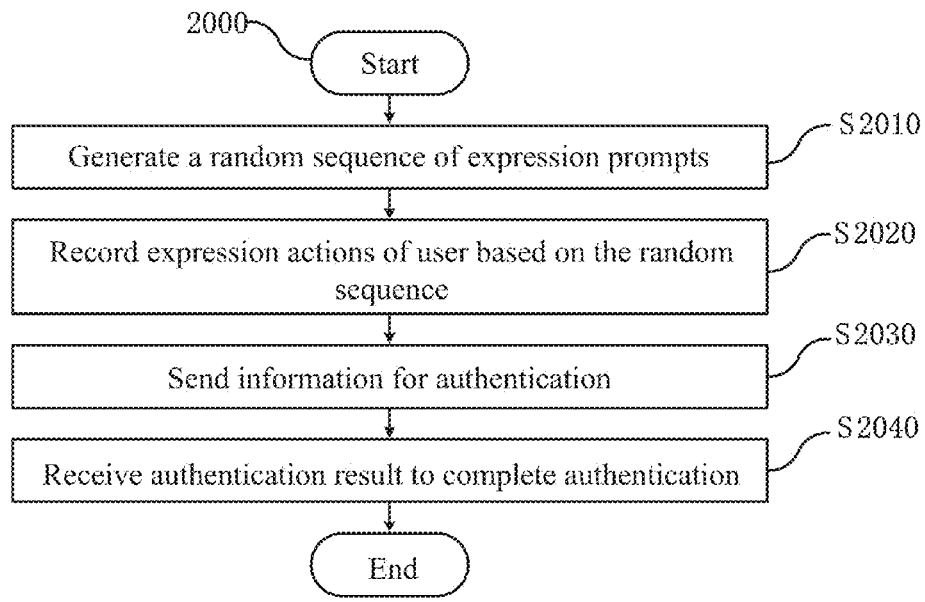
FIG. 2 shows a flowchart of an authentication method, according to an embodiment of this disclosure.

FIG. 2 shows an authentication method 2000, according to an embodiment of this disclosure.

At step S2010, a random sequence comprising at least one expression prompt is generated. The expression prompt is used to prompt a user to take a corresponding expression action. The expression prompt is used to prompt a user to take a corresponding expression action among others. The expression action could be, for example, smiling, winking, opening mouth, sticking tongue out, frowning, and so on. For example, a prompt message may be displayed on a screen. For example, a user may be prompted by a speaker to take a corresponding expression action.

In this embodiment, "random" means unpredictable for a user, that is, the "sequence", "statement", "pattern or character" mentioned herein are unpredictable or are hard to predict for users. For example, taking "a sequence comprising at least one expression prompt" as an example, in authentication, it is difficult for the person to be authenticated, to predict the sequence of expression prompts. For example, during two authentication processes, the sequences of expression prompts may be the same or different, wherein the order of prompts comprised in the sequences may be the same or different, and/or the number of prompts comprised in the sequences may be the same or different. More generally, in practical applications, during multiple authentication processes, at least two different sequences of "expression" prompts, or at least two different "statements", or at least two different "patterns or characters" may be presented.

At step S2020, expression actions that are taken by the user based on the random sequence are recorded. For example, the expression actions may be recorded using a camera. For example, the recorded expression actions of the user may correspond to the expression prompts in the random sequence.

At step S2030, information for authentication is sent. The information for authentication comprises random information of the random sequence and expression information of the recorded expression actions.

At step S2040, an authentication result is received to complete the authentication. For example, if the user passes the authentication, subsequent operations of the user are permitted. The authentication result is based on the information for authentication. For example, the authentication result is based on the random information and the expression information.

Next, modifications that can be made based on the embodiment of this disclosure will be described.

In an example of this embodiment, the authentication method further comprises locking the user's face during the process of recording expression actions of the user. If the user's face moves out of a locking area, the authentication will fail, or the user will be asked to restart the recording process.

Examples of "locking" include, in an example of a smart phone, a person's face is kept in a shooting range of a camera. Generally, a locking box can be further displayed on the screen of the phone to prompt the user whether he/she has moved out of the shooting range. However, additional technical effects may be produced through random authentication based on facial expression actions while having the user' face locked, enabling more secure authentication.

In another example of this disclosure, the authentication method further comprises generating a random statement, and recording sounds of the user reading the random statement, and mouth movements of the user. For example, the mouth movements refer to the opening/closing degree of the mouth of a user. In this case, the information for authentication may further comprise random statement information of the random statement, sound information of the recorded sounds, and mouth information of the recorded mouth movements. For example, the authentication result can be further based on the random statement information, the sound information and the mouth information.

In another example of this disclosure, the authentication process may be further based on reading of a random statement by the user, making it more difficult for a fraud to cheat. In addition, security can be further improved if the user's face is locked and his/her mouth movements are recorded during his/her reading.

In another example of this disclosure, the user can be asked to record fingerprint information of his/her various fingers in advance. The authentication method further comprises generating a random fingerprint prompt for randomly prompting the user to input fingerprint information and recording the fingerprint information of the user. For example, the user may be asked to input fingerprints of different fingers, such as a thumb fingerprint, an index fingerprint and so on. In this case, the information for authentication further comprises the random fingerprint prompt information and the fingerprint information.

In another example of this disclosure, because the user is randomly required to input fingerprint information, security can be improved.

Many current devices (e.g., smart terminal devices) are provided with touch screens. A user may touch on a touch screen to input fingerprints, and the user may further write or draw on the screen by a finger. In this case, a modification can be further made to this disclosure, wherein the user is asked to input random patterns or characters to further improve security. Such a solution will be described in another example of this disclosure.

In another example of this disclosure, the authentication method further comprises generating random pattern and character prompt information, and recording finger movements of the user on the screen based on the random pattern and character prompt information. The user's fingers are locked during the process of recording fingerprint information, and finger movements. In this case, the information for authentication may further comprise the random pattern and character prompt information and finger information of finger movements.

In another example of this disclosure, because the patterns and characters are random in nature, security can be further improved.

In another example of this disclosure, the authentication method further comprises packaging the information for authentication to perform the authentication.

Because authentication information is not packaged for sending, in the case of multiple authentication processes, it is difficult to make a discretion there between. However, with the solution of another example of this disclosure, because information for authentication is packaged, the authentication flexibility may be improved.

Embodiments and examples of this disclosure have been illustrated above. Those skilled in the art can appreciate that various embodiments and examples described above may be adopted separately or in combinations thereof.

Figure 3:
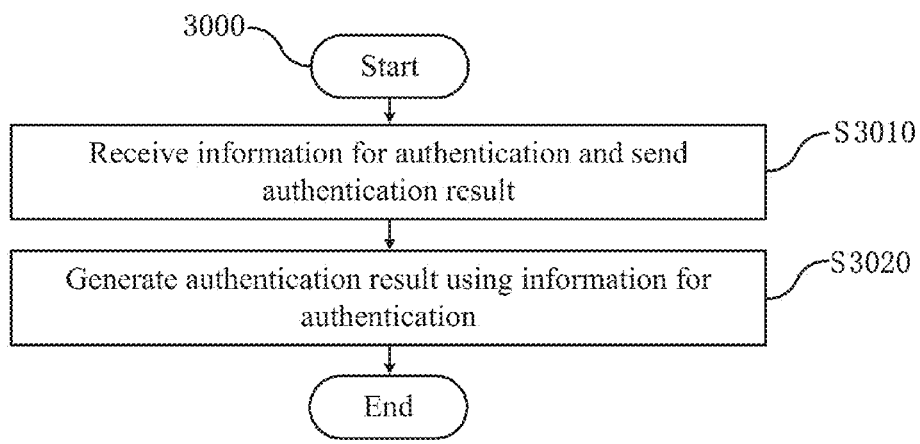
FIG. 3 shows a flowchart of an authentication method, according to an embodiment of this disclosure.

FIG. 3 shows an authentication method 3000, according to an embodiment of this disclosure.

At step S3010, information for authentication is received, and an authentication result is sent. Herein, the information for authentication can at least comprise random information of a random sequence, including at least one expression prompt, and expression information of recorded expression actions.

At step S3020, an authentication result is generated using the information for authentication.

Next, modifications that can be made based on the embodiment of this invention will be described.

In another example of this embodiment, the authentication can be further performed based on random statement. In this case, the information for authentication may further comprise random statement information of random statement, sound information of recorded sounds, and mouth information of recorded mouth movements.

In another example of this embodiment, the authentication can be further performed based on fingerprint information. In this case, the information for authentication may further comprise a random fingerprint prompt, the information for randomly prompting a user to input fingerprint information, and the fingerprint information of the user.

In another example of this embodiment, the authentication can be further performed based on fingerprint movements. In this case, the information for authentication may further comprise random pattern or text prompt information and finger information of finger movements.

In another example of this embodiment, information that is received and sent is packaged, to improve the flexibility of the system. In this case, the information for authentication is packaged information for authentication. Further, the method further comprises packaging the authentication result and sending the packaged authentication result.

Embodiments and examples of this disclosure have been illustrated above. Those skilled in the art can appreciate that various embodiments and examples described above may be adopted separately or in combinations thereof.

Figure 4:
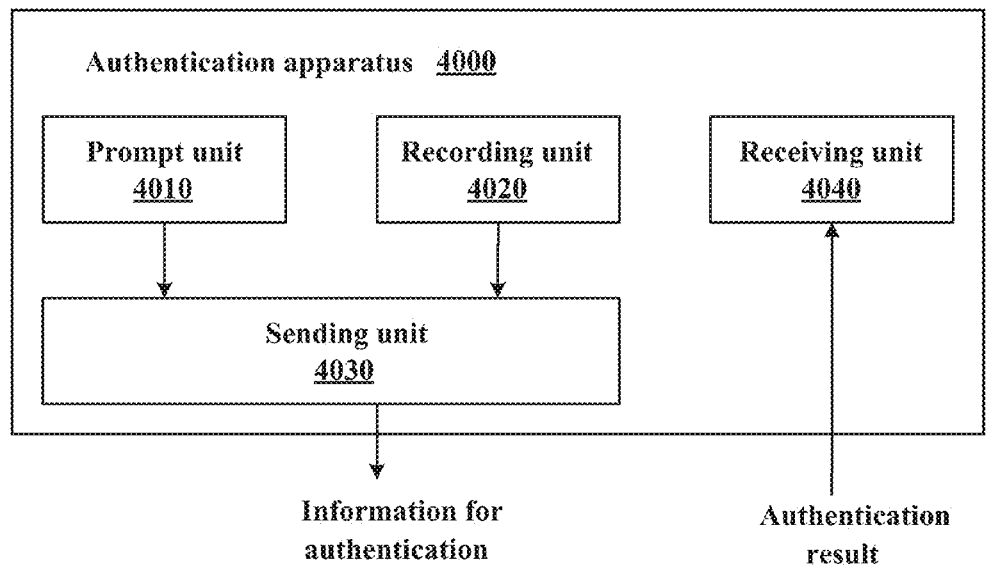
FIG. 4 shows a block diagram of an authentication apparatus, according to an embodiment of this disclosure.

FIG. 4 shows a block diagram of an authentication apparatus 4000, according to an embodiment of this disclosure. As shown in FIG. 4, the authentication apparatus 4000 comprises a prompt unit 4010, a recording unit 4020, a sending unit 4030, and a receiving unit 4040.

The prompt unit 4010 can be configured to generate a random sequence comprising at least one expression prompt. The expression prompt is used, among others, to prompt a user to take a corresponding expression action among others. The expression action can be for example smiling, winking, opening mouth, sticking tongue out, frowning and so on. For example, the prompt unit 4010 can comprise a screen, wherein prompt information is displayed on the screen. For example, the prompt unit 4010 can comprise a speaker, wherein a user will be prompted by the speaker to take a corresponding expression action.

The recording unit 4020 may be configured to record expression actions that are taken by the user based on the random sequence. For example, the recording unit 4020 may comprise a camera. The recording unit may record expression actions of the user corresponding to the expression prompts in the random sequence.

The sending unit 4030 may be configured to send information for authentication. Wherein the information for authentication comprises random information of the random sequence and expression information of the recorded expression actions.

The receiving unit 4040 may be configured to receive an authentication result complete the authentication. The authentication result is based on the information for authentication. For example, the authentication result is the result authenticated based on the random information and the expression information. For example, if the user passes the authentication, subsequent operations of the user are permitted.

For example, the sending unit 4030 and the receiving unit 4040 may be internal sending/receiving units of an apparatus, or external sending/receiving units of an external communication device.

Next, modifications that can be made based on the embodiment of this disclosure will be described.

In an example of this embodiment, the recording unit 4020 can be further configured to lock the user's face during the process of recording the expression actions of the user. If the user's face moves out of a locking area, the authentication will fail, or the user will be asked to restart the recording process.

In another example of this embodiment, the prompt unit 4010 can be further configured to generate random statement. For example, the random statement can be displayed on the screen, or sounds of the random statement may be outputted from a speaker.

The user may read the random statement according to the prompt of the prompt unit 4010.

The recording unit 4020 may be further configured to record sounds of the user reading the random statement, and mouth movements of the user.

In another example of this embodiment, the information for authentication can further comprise random statement information of the random statement, sound information of the recorded sounds, and mouth information of the recorded mouth movements. In this case, for example, the authentication result can be further based on the random statement information, the sound information, and the mouth information.

In another example of this embodiment, the authentication process can be further based on reading random statement by the user, making it more difficult for a fraud to cheat. In addition, security may be further improved if the user's face is locked during his/her reading to record his/her mouth movements.

In another example of this embodiment, the user may be asked to record fingerprint information of his/her various fingers in advance. Because how to record fingerprint information is well known in the art, it will not be described herein further.

In another example of this embodiment, the receiving unit 4040 can be further configured to generate random fingerprint prompt information, randomly prompting the user to input fingerprint information and recording the fingerprint information of the user. For example, the user can be asked to input fingerprints of different fingers, such as a thumb fingerprint, an index fingerprint and so on.

The user may input fingerprints according to prompts.

The recording unit 4020 may be further configured to record fingerprint information of the user.

In another example of this embodiment, the information for authentication further comprises the random fingerprint prompt information and the fingerprint information. In this case, for example, the authentication result can be further based on the random fingerprint prompt information and the fingerprint information.

Many current devices are provided with touch screens. A user may touch on a touch screen to input fingerprints, and the user may further write or draw on the screen by a finger. In this case, a modification could be further made to this embodiment, wherein the user is asked to input random patterns or characters to further improve security. Such a solution will be described in another example of this embodiment.

In another example of this embodiment, the prompt unit 4010 may be further configured to generate random pattern and character prompt information.

The user may input random characters or patterns according to prompts.

The recording unit 4020 may be further configured to record finger movements of the user on the screen, based on the random pattern and character prompt information.

Further, if the recording unit 4020 may be configured to lock fingers of the user when fingerprint information and finger movements are recorded, a fraud may be further prevented from cheating, thereby further improving security.

In another example of this embodiment, the information for authentication can further comprise the random pattern and character prompt information and finger information of finger movements. In this case, for example, the authentication result can be further based the pattern and character information and the finger information.

In another example of this embodiment, because the patterns and characters are random, security can be further improved.

In another example of this embodiment, the sending unit 4030 can be further configured to package the information for authentication, and send the packaged information for authentication.

Embodiments and examples of this disclosure have been illustrated above. Those skilled in the art may appreciate that various embodiments and examples described above may be adopted separately or in combinations thereof.

Figure 5:
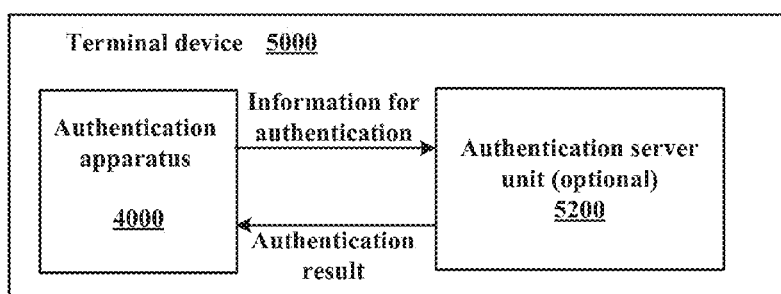
FIG. 5 shows a block diagram of a terminal device, according to an embodiment of this disclosure.

FIG. 5 shows a block diagram of a terminal device 5000 according to an embodiment of this disclosure.

The terminal device 5000 may for example comprise an authentication apparatus 4000 according to the embodiment. The terminal device 5000 may be for example a smart terminal, such as a smart phone, a tablet computer, and so on; or it may be a computer terminal, such as a computer, a notebook computer, and so on.

Next, modifications that can be made based on the embodiment of this disclosure will be described.

In another example of this embodiment, optionally, the terminal device 5000 may further comprise an authentication server unit 5200. The authentication server unit 5200 may be configured to receive information for authentication from the authentication apparatus 4000, perform authentication based on the information for authentication, and send an authentication result to a receiving unit of the authentication apparatus 4000. In this case, the terminal device 5000 may perform authentication locally without networking authentication.

Figure 6:
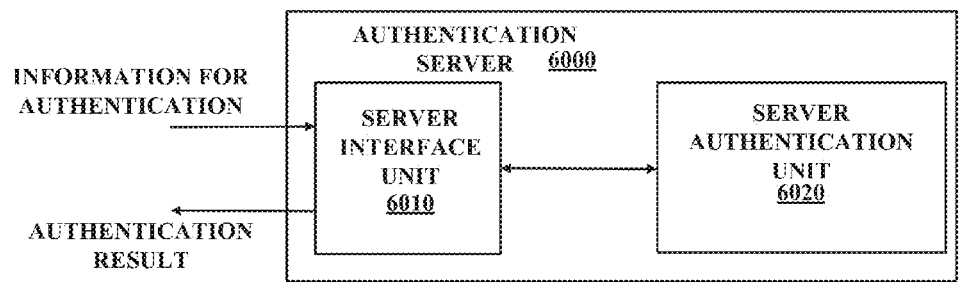
FIG. 6 shows a block diagram of an authentication server, according to an embodiment of this disclosure.

FIG. 6 shows an authentication server 6000 according to an embodiment of this disclosure.

The authentication server 6000 comprises a server interface unit 6010, and a server authentication unit 6020.

The server interface unit 6010 may be configured to receive information for authentication, and send an authentication result.

The server authentication unit 6020 may be configured to use the information for authentication to generate an authentication result. In this embodiment, the information for authentication may comprise at least random information of a random sequence comprising at least one expression prompt, and expression information of the recorded expression actions. For example, if the information for authentication corresponds to predetermined rules, and/or information registered in advance, the server authentication unit 6020 generates a successful authentication result; otherwise, the server authentication unit 6020 generates a failed authentication result. For example, if the recorded expression actions are consistent with the random sequence of expression prompts, the server authentication unit 6020 confirms the liveness of the user and permits subsequential authentication processes (e.g., comparing recorded facial features with facial features that are registered in advance.)

Next, modifications that can be made based on the embodiment of this disclosure will be described.

In another example of this embodiment, the server authentication unit 6020 can further perform authentication based on random statement. In this case, the information for authentication may further comprise random statement information of random statement, sound information of recorded sounds, and mouth information of recorded mouth movements.

In another example of this embodiment, the server authentication unit 6020 can further perform authentication based on fingerprint information. In this case, the information for authentication may further comprise random fingerprint prompt information for randomly prompting the user to input fingerprint information and fingerprint information of the user.

In another example of this embodiment, the server authentication unit 6020 can further perform authentication based on finger movements. In this case, the information for authentication may further comprise random pattern and character prompt information and finger information of the finger movements.

In another example of this embodiment, the server interface unit 6010 can be further configured to receive packaged information for authentication, and may further configured to package an authentication result, and send the packaged authentication result.

Embodiments and examples of this disclosure have been illustrated above. Those skilled in the art can appreciate that various embodiments and examples described above may be adopted separately or in combinations thereof.

Figure 7:
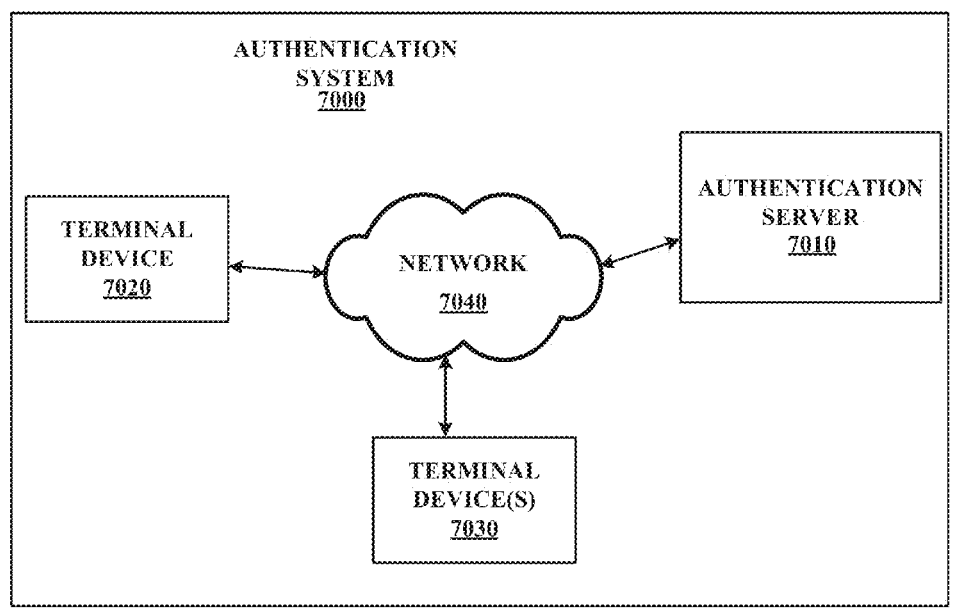
FIG. 7 shows a block diagram of an authentication system, according to an embodiment of this disclosure.

FIG. 7 shows an authentication system 7000 according to an embodiment of this disclosure. The authentication system 7000 comprises an authentication server 7010 and terminal devices 7020, 7030. For example, the authentication server 7010 and terminal devices 7020, 7030 may be connected with each other through, for example, a network 7040. However, those skilled in the art may appreciate that the authentication server 7010 and terminal devices 7020, 7030 may be connected in another manner. The authentication server 7010 may be, for example, an authentication server according to an embodiment of this disclosure. The terminal devices 7020, 7030 may be, for example, terminal devices according to an embodiment of this disclosure.

An example of a particular application of this disclosure will be described with reference to FIG. 8. Those skilled in the art may appreciate, although various embodiments and examples described above are embodied in the example shown in FIG. 8, these embodiments and examples are merely for the purpose of illustration, which may be applied separately.

Figure 8:
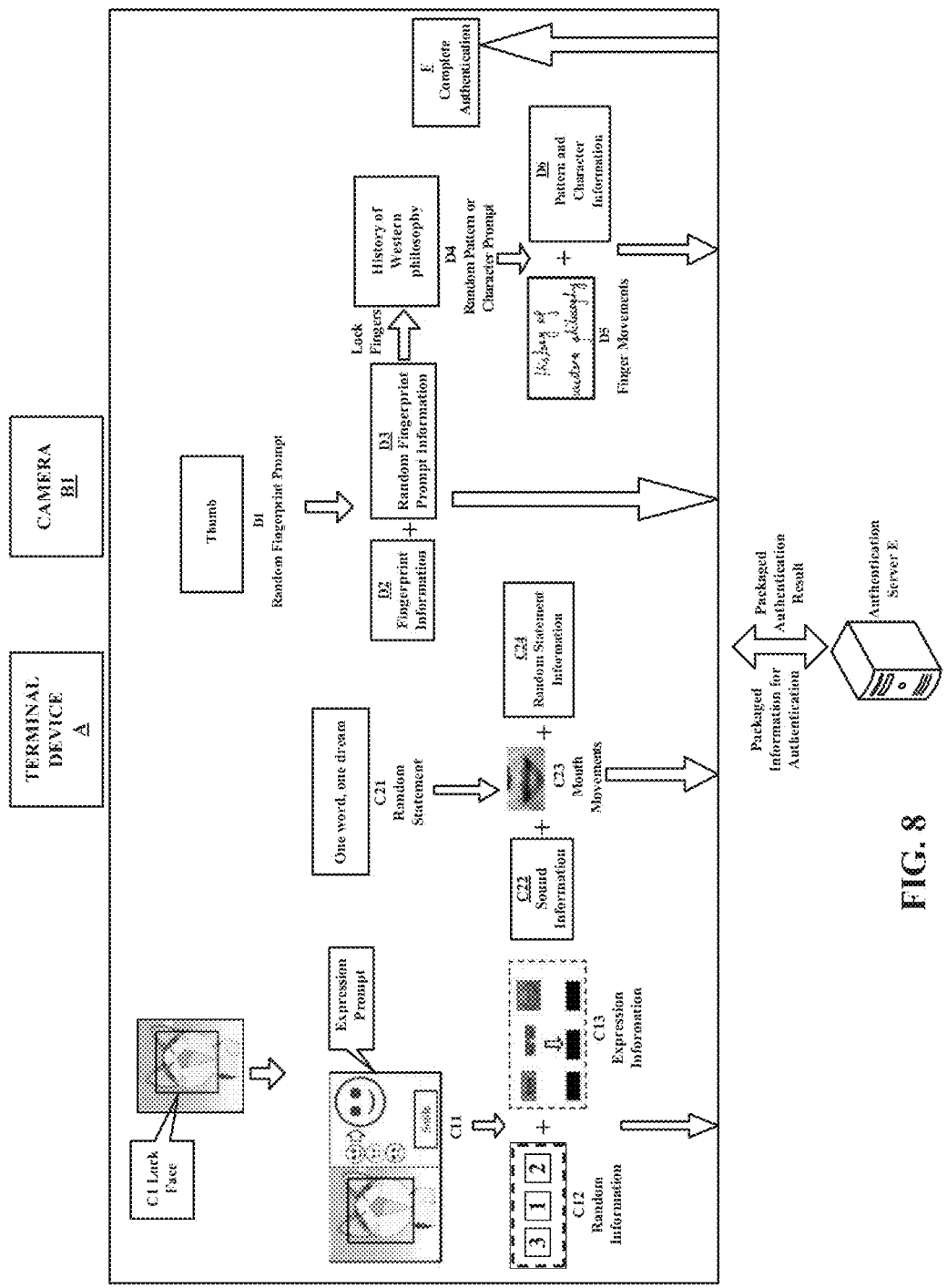
FIG. 8 shows an example of a specific application, according to this disclosure.

In the example shown in FIG. 8, terminal device A is for example a smart phone or a tablet computer, which comprises camera B. For example, during an authentication process, a user's face can be recorded and locked by camera B. Terminal device A further comprises the authentication apparatus according to this embodiment, for example.

Terminal device A communicates with authentication server E to perform authentication. Below, an authentication process will be particularly described with reference to FIG. 8.

This embodiment may be merely used to authenticate the liveness of a user. In this case, this embodiment may be combined with existing face authentication methods. That is, the authentication methods of this embodiment and the prior art may be used simultaneously, wherein the liveness of a user is detected using this disclosure and the identity of the user is detected using an authentication method in the prior art.

Optionally, the liveness and identity of a user may be authenticated by using this embodiment directly. In this case, the user may be asked to record his/her face features and fingerprint information in advance.

Terminal device A may, for example, traces the user's face through camera B (C1. Lock face). Further, as shown in this figure, terminal device A may further provide a locking box on its screen to prompt the user his/her face has been locked and should not move out of the locking box during the recording process. As shown in this figure, terminal device A prompts the user to take corresponding expression actions on its screen (C11. expression prompt). For example, a random sequence in this figure comprises three expression prompts. The user takes a corresponding expression action according to a current prompt (e.g., smiling) The expression action of the user is recorded. Thus, random information of the random sequence of expression prompts (C12. Random information) and expression information of recorded expression actions (C13. Expression information) is obtained.

Terminal device A may further prompt random statement on its screen (C21. Random statement). The user reads the random statement according to the prompts. Terminal device A records sounds and mouth movements of the user. Then, terminal device A obtains sound information of the recorded sounds (C22. Sound information), mouth information of the recorded mouth movements (C23. Mouth movements) and random statement information of the recorded random statement (C24. Random statement information).

Terminal device A may further prompt the user to input fingerprint information on its screen (D1. Random fingerprint prompt), for example, his thumb. The user presses his/her thumb on the screen to input fingerprint information (D2. Fingerprint information). Meanwhile, terminal device A further records the prompted random fingerprint prompt information (D3. Random fingerprint prompt information).

When recording fingerprint information, terminal device A may further lock the finger. For example, during the locking period, terminal device A may detect that the finger does not leave off the screen. During the locking period, terminal device A may display random patterns or characters (D4. Random pattern or character prompt), for example, "history of western philosophy". The user writes corresponding characters or draws corresponding patterns on the screen according to the prompt. Terminal device A records finger movements of the user (D5. Finger movements) and pattern and character information of the random pattern or character prompt information (D6. pattern and character information).

Terminal device A packages the obtained random information (C12. Random Information), expression information (C13. Expression Information), sound information (C22. Sound Information), mouth information (C23. Mouth Information), random statement information (C24. Random Statement Information), fingerprint information (D2. Fingerprint Information), random fingerprint prompt information (D3. Random Fingerprint Prompt Information), finger movements (D5. Finger Movements), and pattern and character information (D6. Pattern and Character Information).

Terminal device A sends the packaged information to authentication server E for authentication.

Authentication server E performs authentication based on the above information. Then, the authentication server E packages the authentication result and sends it to terminal device A. The terminal device A completes the authentication process according to the authentication result. For example, in the case of successful authentication, terminal device A permits subsequent operations of the user; or in the case of failed authentication, terminal device A prohibits subsequent operations of the user.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer enabled authentication method, the authentication method comprising:
    generating, during an authentication and by a processor device, a random sequence that includes at least one expression prompt and a random pattern prompt;
    prompting a user to take an expression action that is provided in an expression prompt;
    recording, via a camera, the expression action of the user based on the expression prompt;
    prompting the user to write a random phrase that is provided in the random pattern prompt on the touch screen;
    recording one or more finger movements of the user, wherein the one or more finger movements include the user touching the touch screen;
    packaging authentication information, wherein the authentication information includes at least the expression prompt, the expression action distinct from the expression prompt, the random pattern prompt, the recorded expression action, and the recorded one or more finger movements;
    sending the packaged authentication information to an authentication server; and
    receiving, from the authentication server, a first authentication result, wherein the first authentication result is based on at least a comparison between facial features of the user recorded as the expression action and predetermined rules associated with the expression prompt, wherein the expression action is not matched to prerecorded pictures of the user, and wherein the first authentication result is further based on a comparison between the recorded finger movements of the user and the random phrase.

2. The authentication method according to claim 1, wherein the recording of the expression action further comprises:
    locking, during the recording, a face of the user;
    detecting the face of the user within a shooting range defined by a locking box;
    determining whether the face of the user is out of the shooting range, and
    failing an authentication in response to determining that the face of the user is out of the shooting range.

3. The authentication method of claim 1, further comprising:
    generating a random statement prompt including one or more statements;
    recording sounds and mouth movements of the user speaking the random statement prompt; and
    receiving a second authentication result for the random statement prompt, wherein the second authentication result includes a comparison between the sound and mouth movements of the user for each statement.

4. The authentication method of claim 1, further comprising:
    generating a random fingerprint prompt that requires the user to input fingerprint information on a touch screen in a sequence;
    recording fingerprint information of the user on the touch screen; and
    receiving a third authentication result for the random fingerprint prompt, wherein the third authentication result includes a comparison between the recorded fingerprint information of the user and the random fingerprint prompt.

5. The authentication method of claim 1, further comprising:
    permitting access based on the first authentication result.

6. The authentication method of claim 1, wherein prompting the at least one expression action further comprises:
    locking a face of the user during the expression prompt;
    detecting the face of the user within a shooting range that is defined by a locking box,
    determining whether the face of the user is within the locking box, and
    instructing, in response to the face of the user being within the locking box, the user to perform the expression action.

7. The authentication method of claim 1, wherein the random pattern prompt further includes a random pattern, the method further comprising:
    locking, during a locking period, a finger of the user such that the user is not permitted to remove his finger from the touch screen;
    prompting the user to draw the random pattern on the touch screen; and
    detecting, during the locking period, that the finger does not leave the touch screen, wherein the prompting the user to draw the random pattern and the recording of the one or more finger movements occur during the locking period, and wherein the first authentication result is further based on a comparison between the one or more finger movements of the user and the random pattern.

8. The authentication method of claim 1, wherein the number of prompts in the sequence is random, wherein the authentication server is remote from a terminal device that includes the processor device, the authentication server being configured to provide authentication services to two or more terminal devices, and wherein the authentication server and the terminal device are communicatively coupled via a network.

9. An authentication apparatus, comprising:
a memory;
a processor device communicatively coupled to the memory, wherein the processor device is configured to perform a method comprising:
  generating a random sequence that includes at least one expression prompt, wherein an expression prompt is used to prompt a user to take a corresponding expression action including an expression action that is provided in an expression prompt,
  recording the expression action of the user based on the expression prompt,
  generating a random pattern prompt that requires the user to write a random phrase on a touch screen;
  prompting the user to write the random phrase on the touch screen;
  recording one or more finger movements of the user, wherein the one or more finger movements include the user touching the touch screen;
  packaging authentication information, wherein the authentication information includes at least the expression prompt, the expression action distinct from the expression prompt, the random pattern prompt, the recorded expression action, and the recorded one or more finger movements;
  sending the packaged authentication information to an authentication server; and
  receiving, from the authentication server, a first authentication result, wherein the first authentication result is based on at least a comparison between facial features of the user recorded as the expression action and predetermined rules associated with the expression prompt, wherein the expression action is not matched to prerecorded pictures of the user, and wherein the first authentication result is further based on a comparison between the recorded finger movements of the user and the random phrase.

10. The authentication apparatus according to claim 9, wherein the recording the expression action of the user comprises:
  locking, during the recording, a face of the user by:
    detecting the face of the user within a shooting range defined by a locking box,
    determining whether the face of the user is out of the shooting range, and
    failing an authentication in response to determining that the face of the user is out of the shooting range.

11. The authentication apparatus according to claim 9, wherein the method performed by the processor device further comprises:
  generating a random statement prompt including one or more statements;
  recording sounds and mouth movements of the user speaking the random statement prompt; and
  receiving a second authentication result for the random statement prompt, wherein the second authentication result includes a comparison between the sound and mouth movements of the user for each statement.

12. The authentication apparatus according to claim 9, wherein the method performed by the processor device further comprises:
  generating a random fingerprint prompt that requires the user to input fingerprint information on a touch screen in a sequence;
  recording fingerprint information of the user on the touch screen; and
  receiving a third authentication result for the random fingerprint prompt, wherein the third authentication result includes a comparison between a recorded fingerprint information of the user and the random fingerprint prompt.

* * * * *